United States Patent
Luh

(10) Patent No.: US 6,279,884 B1
(45) Date of Patent: Aug. 28, 2001

(54) SHOCK ABSORBING BUFFER FOR A TRANSMISSION

(75) Inventor: Tai-Yang Luh, Taipei (TW)

(73) Assignee: Jenn Jianq Co. Ltd., Taichung Hsien (TW)

( * ) Notice: Subject to any disclaimer, the term of this patent is extended or adjusted under 35 U.S.C. 154(b) by 0 days.

(21) Appl. No.: 09/666,970

(22) Filed: Sep. 21, 2000

(51) Int. Cl.⁷ ............................................. E16F 7/00
(52) U.S. Cl. ............................... 267/141; 267/153
(58) Field of Search ................................ 267/141, 153, 267/136, 141.11

(56) References Cited

U.S. PATENT DOCUMENTS

| | | | |
|---|---|---|---|
| 3,007,692 | * 11/1961 | Kniffin, Jr. | 267/141 |
| 5,295,755 | * 3/1994 | De Haan, III et al. | 267/141 |
| 5,794,912 | * 8/1998 | Whittaker et al. | 267/141 |
| 6,142,420 | * 11/2000 | Redinger | 267/141 |

* cited by examiner

*Primary Examiner*—Matthew Graham
(74) *Attorney, Agent, or Firm*—Alan Kamrath; Rider, Bennett, Egan & Arundel, LLP

(57) ABSTRACT

A transmission mechanism has an outer casing. A hollow tube is connected to a bottom of the outer casing. A main frame has a panel having a round aperture. A shock absorbing assembly has a buffer device, a positioning seat disposed on the buffer device, and a screw rod fastening the positioning seat and the hollow tube together.

1 Claim, 8 Drawing Sheets

SHOCK ABSORBING BUFFER FOR A TRANSMISSION

BACKGROUND OF THE INVENTION

The present invention relates to a shock absorbing assembly. More particularly, the present invention relates to a shock absorbing assembly for a transmission mechanism.

Referring to FIGS. 1 to 3A, a shock absorbing device 20 has a first collar 21, a first sleeve 22 inserted in the first collar 21, the first collar 21 having a lug 24, the first sleeve 22 having an elastic cylinder 23, a washer 27, a first screw rod 15, and a second screw rod 17. The lug 24 has a round hole 25. The elastic cylinder 23 has a center hole 26. A transmission mechanism 30 has an outer casing 31. A hollow tube 32 is connected to a bottom of the outer casing 31. A rod 11 is disposed on a main frame 10. Two upper bars 12 are disposed on the rod 11. A hollow pillar 14 is disposed between the upper bars 12. The hollow pillar 14 has a through aperture 13. The first screw rod 15 passes through the washer 27, the center hole 26 of the elastic cylinder 23, the through aperture 13 of the hollow pillar 14, a second sleeve 22', a second collar 21', and a first nut 16. The second screw rod 17 passes through the round hole 25 of the lug 24, the hollow tube 32, and a second nut 18. Since the first collar 21 contacts the upper bar 12, a noise will occur while the first collar 21 bumps the upper bar 12. Furthermore, the shock absorbing area of the shock absorbing device 20 is small so that the shock absorbing effect is not very effective.

SUMMARY OF THE INVENTION

An object of the present invention is to provide a shock absorbing assembly which has an effective shock absorbing effect.

Accordingly, a transmission mechanism has an outer casing. A hollow tube is connected to a bottom of the outer casing. A main frame has a panel having a round aperture. A shock absorbing assembly comprises a buffer device, a positioning seat disposed on the buffer device, and a screw rod fastening the positioning seat and the hollow tube together. The buffer device has a shock-absorbing elastic block, an upper metal plate disposed on a top portion of the shock-absorbing elastic block, a lower metal plate disposed on a bottom of the shock-absorbing elastic block, an upper stud disposed on a top portion of the upper metal plate, and a lower stud disposed on a bottom of the lower metal plate. The positioning seat has a bottom through hole, and two upper bars enclosing two ends of the hollow tube. Each of the upper bars has a through aperture. The upper stud passes through the bottom through hole of the positioning seat. A first nut fastens the positioning seat and the upper stud together. The lower stud passes through the round aperture of the panel. A second nut fastens the panel and the lower stud together.

DETAILED DESCRIPTION OF THE INVENTION

Figure 1:
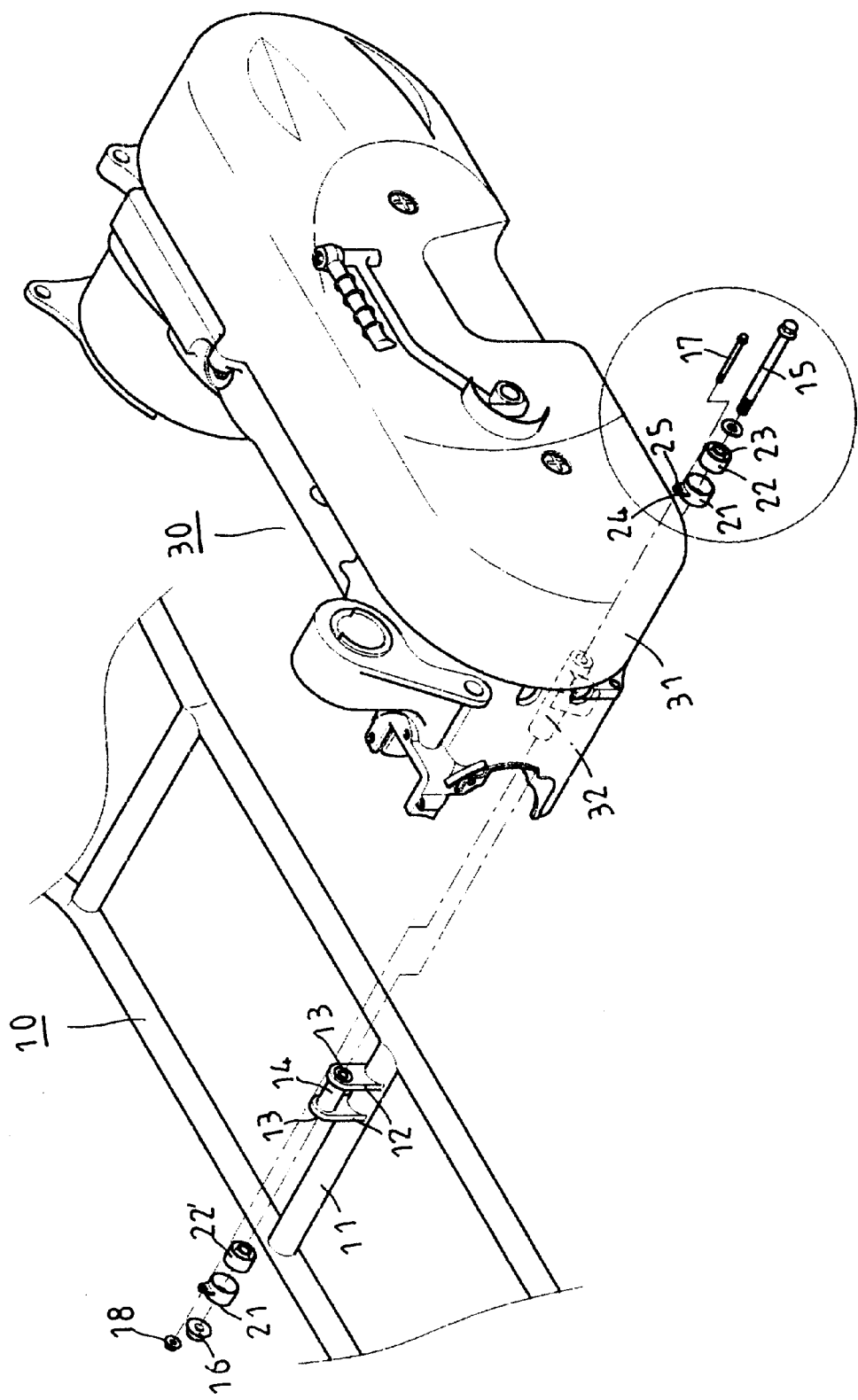
FIG. 1 is a perspective exploded view of a shock absorbing device and a transmission mechanism of the prior art.
Figure 1A:
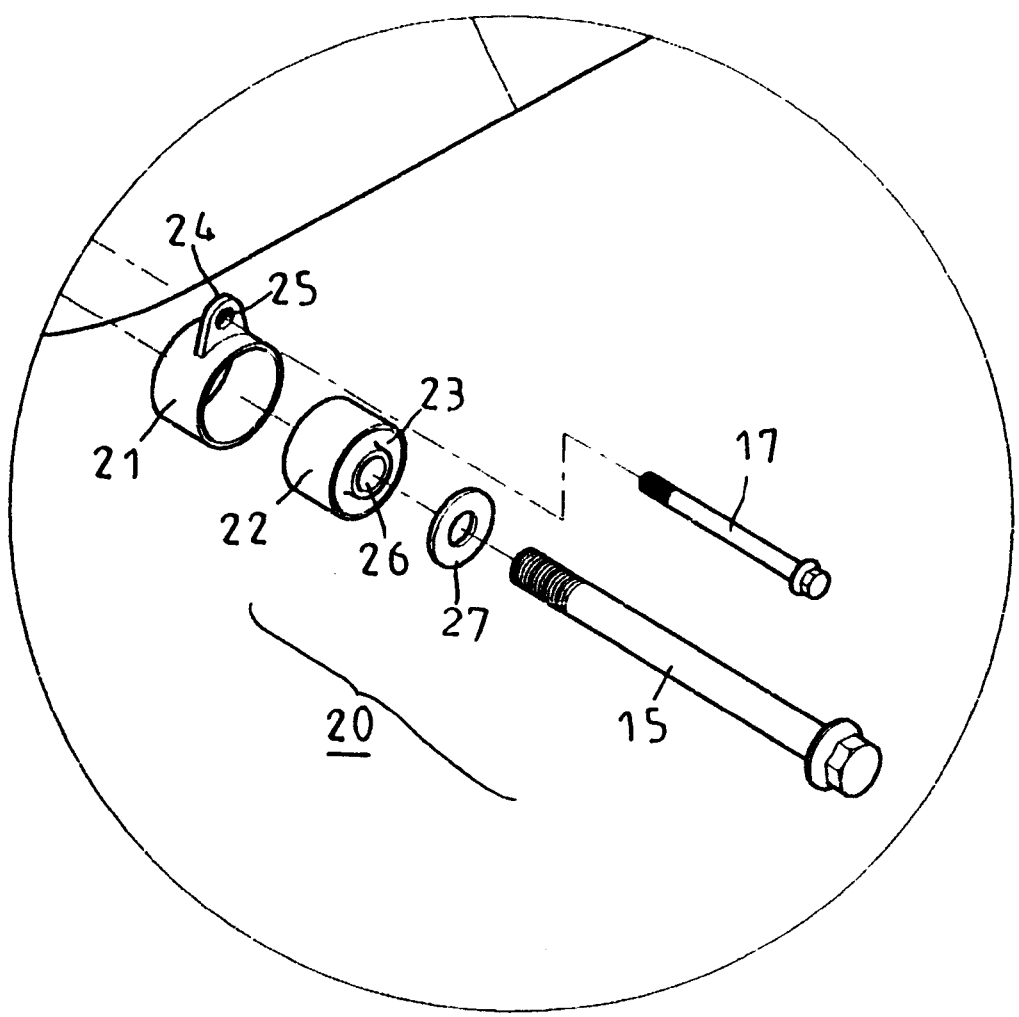
FIG. 1A is a perspective exploded view of a shock absorbing device of the prior art.
Figure 2:
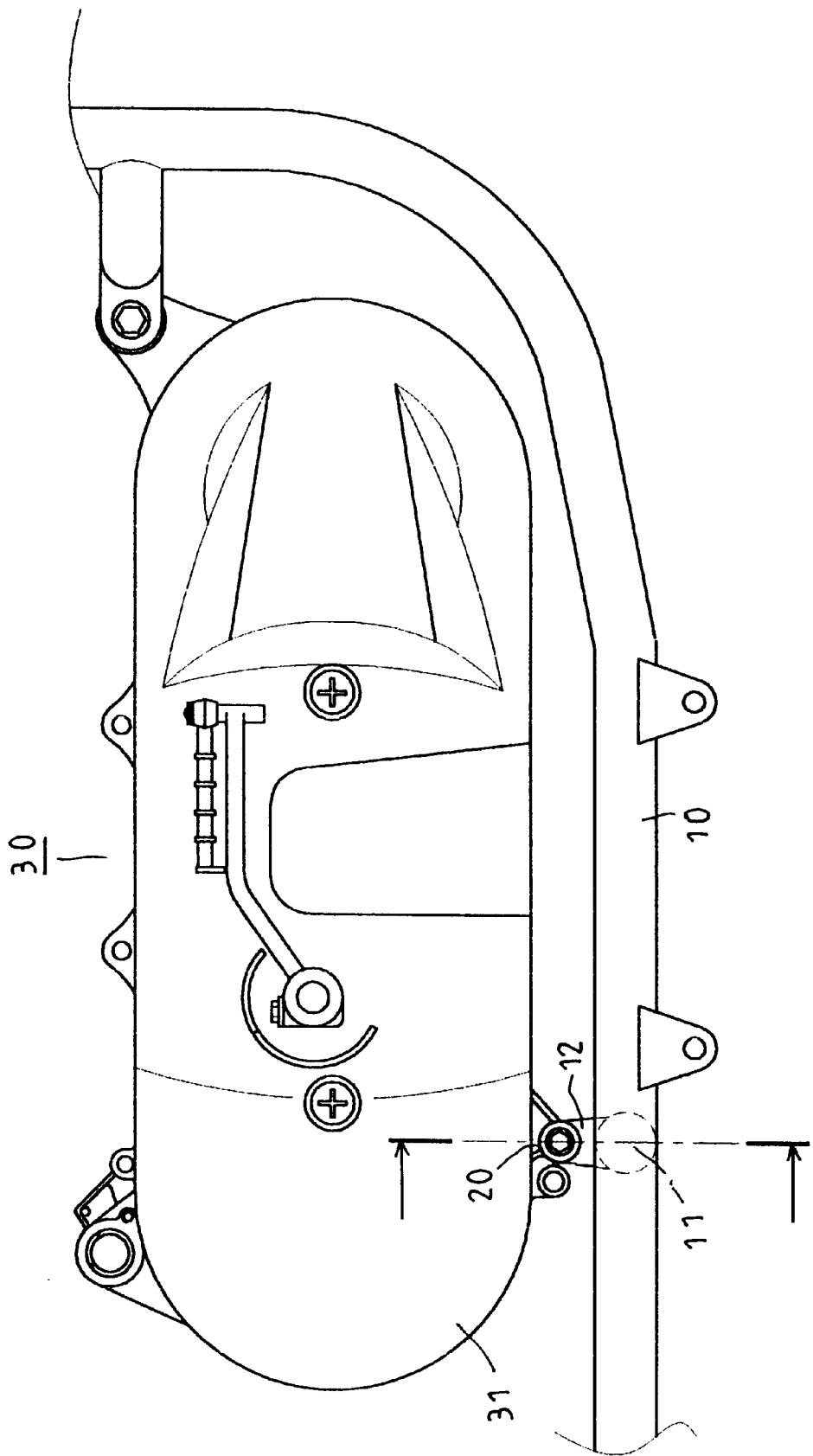
FIG. 2 is an elevational assembly view of a shock absorbing device and a transmission mechanism of the prior art.
Figure 3:
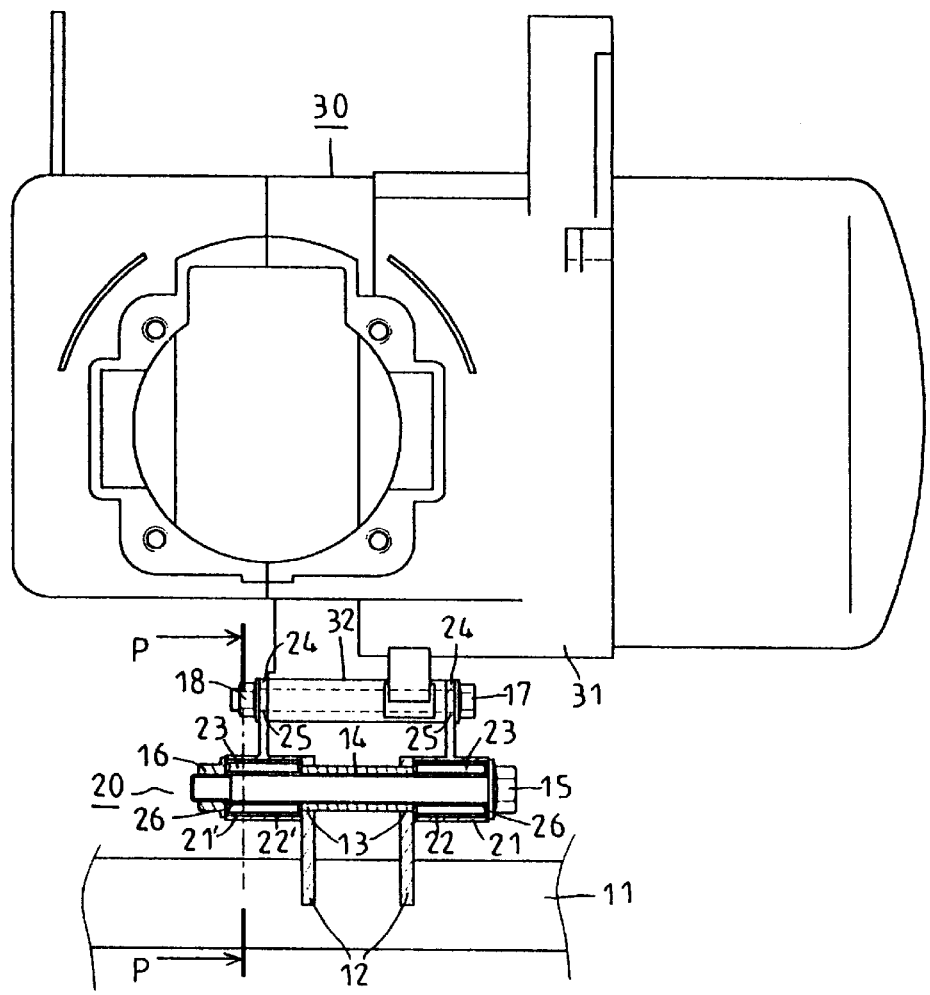
FIG. 3 is a sectional assembly view of a shock absorbing device of the prior art.
Figure 3A:
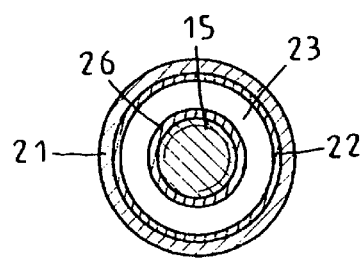
FIG. 3A is a sectional view taken along line 3P—3P in FIG. 3.
Figure 4:
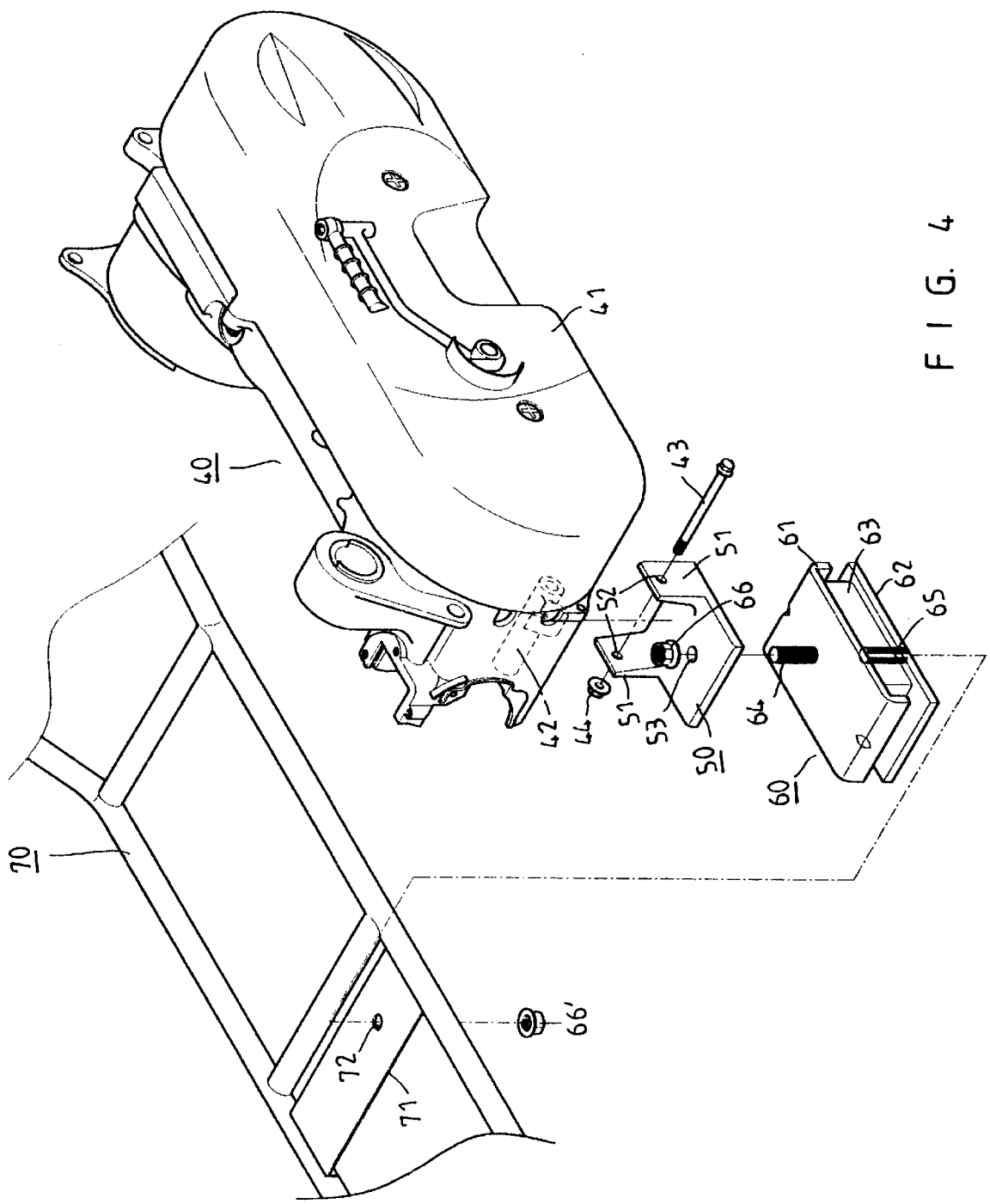
FIG. 4 is a perspective exploded view of a shock absorbing assembly and a transmission mechanism of a preferred embodiment in accordance with the present invention.
Figure 5:
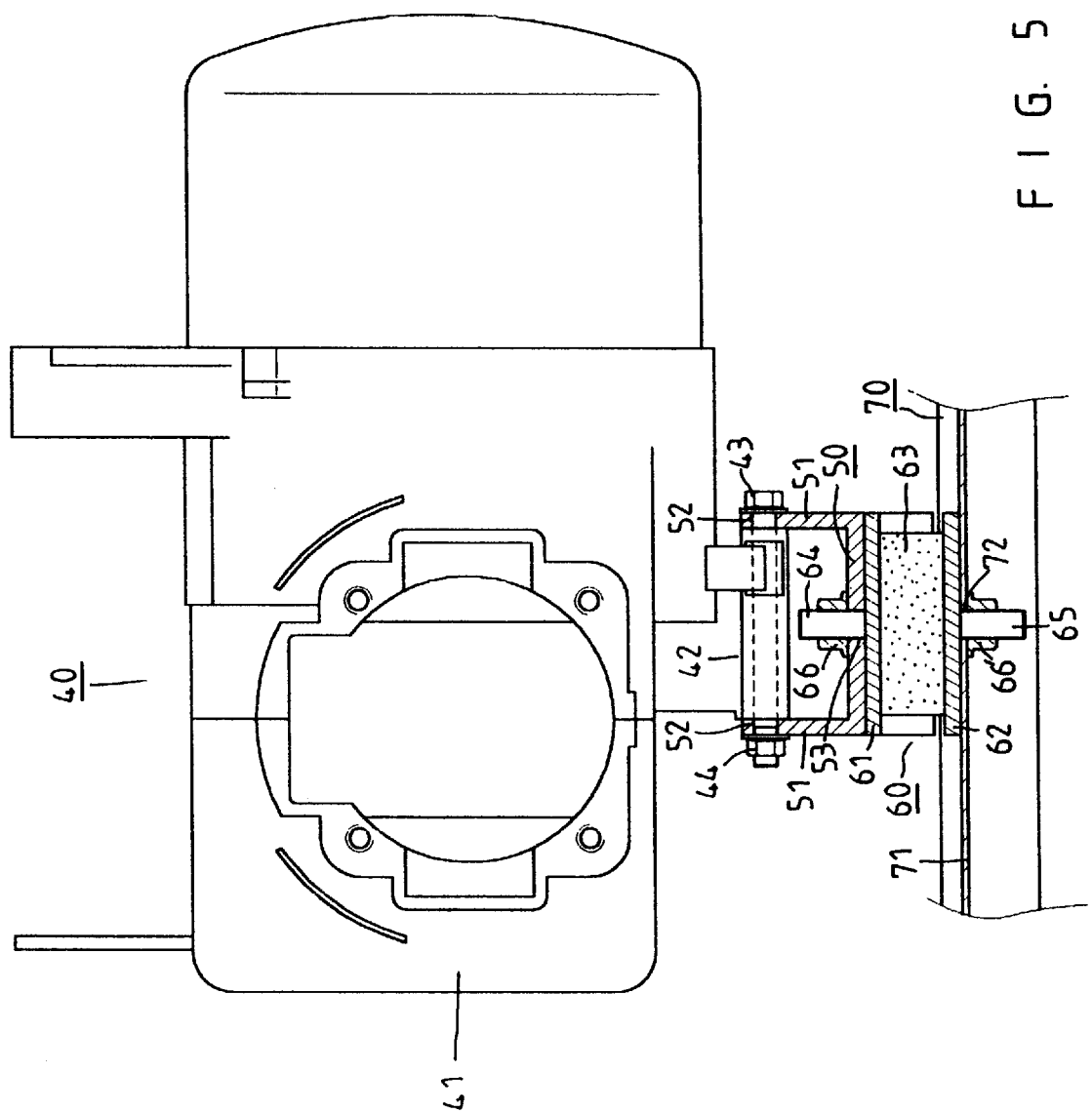
FIG. 5 is a sectional assembly view of a shock absorbing assembly of a preferred embodiment in accordance with the present invention.
Figure 6:
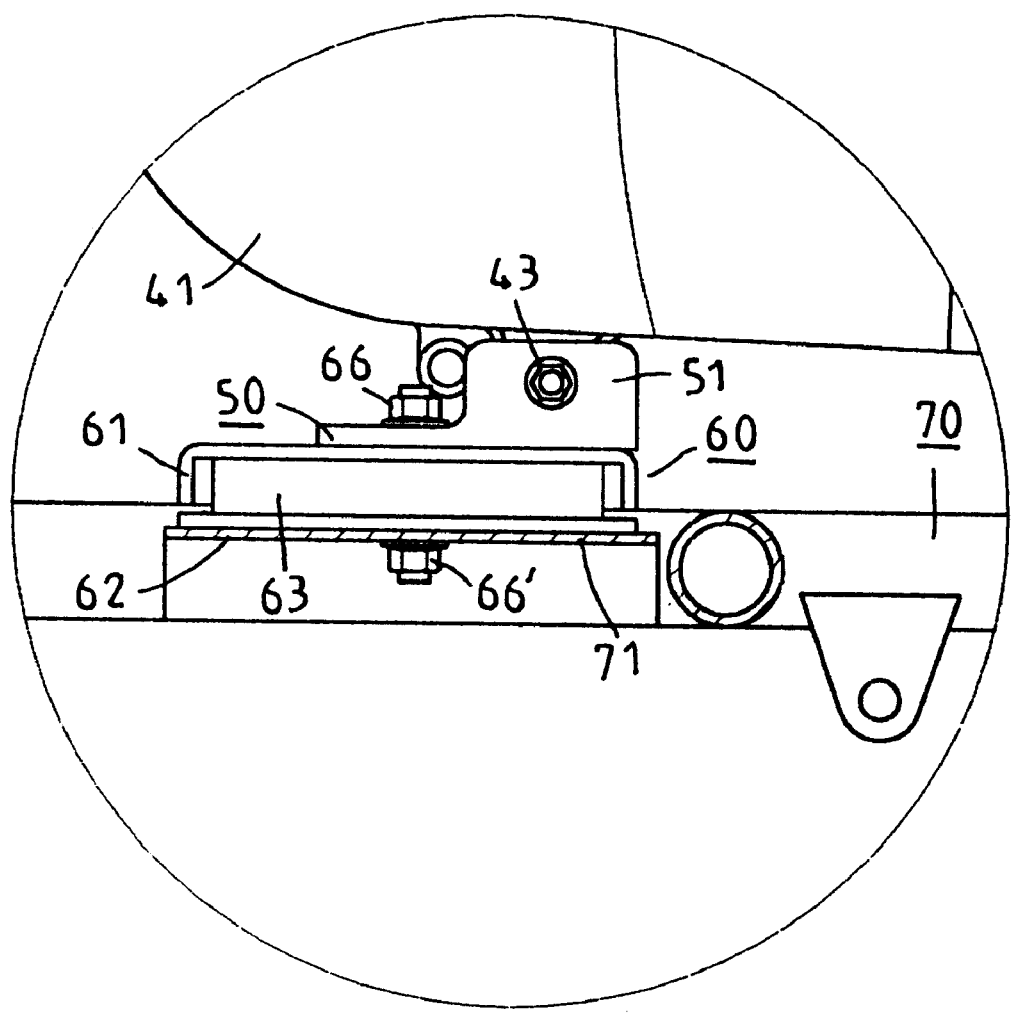
FIG. 6 is a schematic view illustrating an operation of a shock absorbing assembly of a preferred embodiment in accordance with the present invention.
Figure 6A:
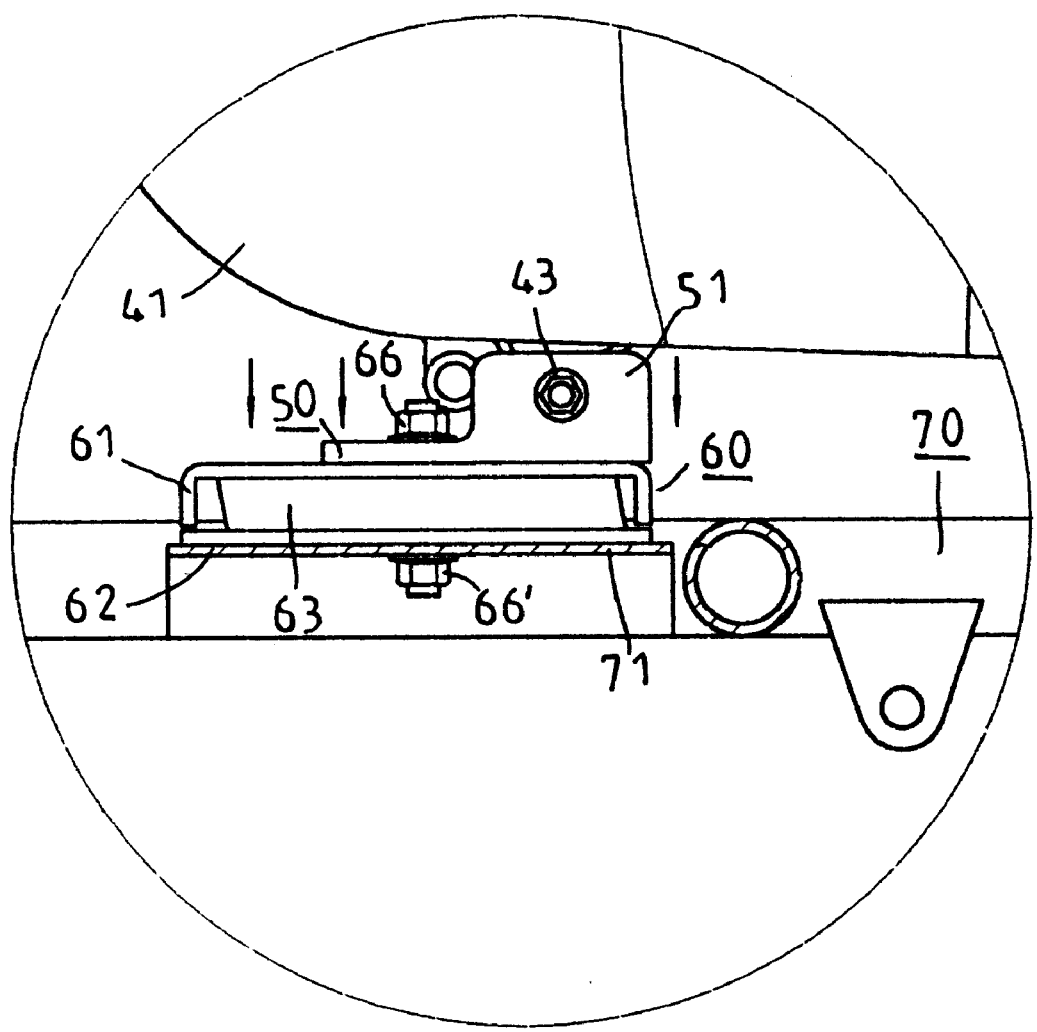
FIG. 6A is another schematic view illustrating an operation of a shock absorbing assembly of a preferred embodiment in accordance with the present invention.

Referring to FIGS. 4 to 6A, a transmission mechanism 40 has an outer casing 41. A hollow tube 42 is connected to a bottom of the outer casing 41. A main frame 10 has a panel 71 having a round aperture 72.

A shock absorbing assembly comprises a buffer device 60, a positioning seat 50 disposed on the buffer device 60, and a screw rod 43 fastening the positioning seat 50 and the hollow tube 42 together.

The buffer device 60 has a shock-absorbing elastic block 63, an upper metal plate 61 disposed on a top portion of the shock-absorbing elastic block 63, a lower metal plate 62 disposed on a bottom of the shock-absorbing elastic block 63, an upper stud 64 disposed on a top portion of the upper metal plate 61, and a lower stud 65 disposed on a bottom of the lower metal plate 62.

The positioning seat 50 has a bottom through hole 53, and two upper bars 51 enclosing two ends of the hollow tube 42.

Each of the upper bars 51 has a through aperture 52. The upper stud 64 passes through the bottom through hole 53 of the positioning seat 50. A first nut 66 fastens the positioning seat 50 and the upper stud 64 together.

The lower stud 65 passes through the round aperture 72 of the panel 71. A second nut 66' fastens the panel 71 and the lower stud 65 together.

Since the upper bars 51 encloses two ends of the hollow tube 42, the shock will be dispersed by the upper bars 51 and transported to the buffer device 60 evenly.

The invention is not limited to the above embodiment but various modification thereof may be made. Further, various changes in form and detail may be made without departing from the scope of the invention.

I claim:

1. A transmission mechanism having an outer casing, a hollow tube connected to a bottom of the outer casing, and a main frame having a panel having a round aperture, characterized in that:

a shock absorbing assembly comprises a buffer device, a positioning seat disposed on the buffer device, and a screw rod fastening the positioning seat and the hollow tube together, the buffer device has a shock-absorbing elastic block, an upper metal plate disposed on a top portion of the shock-absorbing elastic block, a lower metal plate disposed on a bottom of the shock-absorbing elastic block, an upper stud disposed on a top portion of the upper metal plate, and a lower stud disposed on a bottom of the lower metal plate, the positioning seat has a bottom through hole, and two upper bars enclosing two ends of the hollow tube, each of the upper bars has a through aperture, the upper stud passes through the bottom through hole of the positioning seat, a first nut fastens the positioning seat and the upper stud together, the lower stud passes through the round aperture of the panel, and a second nut fastens the panel and the lower stud together.

* * * * *